United States Patent

Taki et al.

[11] Patent Number: 5,095,478
[45] Date of Patent: Mar. 10, 1992

[54] OPTICAL DATA STORAGE MEDIUM HAVING INTERFERENCE AND FLATTENING LAYERS EACH HAVING SPECIFIC THICKNESS FOR IMPROVED INFORMATION READING AND TRACKING RELIABILITY

[75] Inventors: Kazunari Taki, Nagoya; Hideo Maruyama, Kuwana; Riki Matsuda, Nagoya; Yumiko Ohashi, Hashima, all of Japan

[73] Assignee: Brother Kogyo Kabushiki Kaisha, Aichi, Japan

[21] Appl. No.: 597,171

[22] Filed: Oct. 15, 1990

[30] Foreign Application Priority Data

Oct. 23, 1989 [JP] Japan ................... 1-275393

[51] Int. Cl.$^5$ ........................... G11B 7/24
[52] U.S. Cl. ................... 369/275.4; 369/288; 369/286; 369/275.5; 369/275.1; 346/135.1; 428/694; 430/945
[58] Field of Search ............ 369/13, 14, 275.2, 275.1, 369/275.3, 275.5, 288, 284, 286; 360/59, 131, 114; 430/945, 495, 270; 428/694, 900; 346/135.1

[56] References Cited

U.S. PATENT DOCUMENTS

| | | | |
|---|---|---|---|
| 4,569,881 | 2/1986 | Freese et al. | 369/13 |
| 4,737,877 | 4/1988 | Krongelb et al. | 369/284 |
| 4,839,226 | 6/1989 | Sawada et al. | 428/900 |
| 4,875,987 | 10/1989 | Wada et al. | 428/900 |
| 4,985,885 | 1/1991 | Ohta et al. | 369/275.1 |
| 5,041,356 | 8/1991 | Takeda et al. | 430/270 |

*Primary Examiner*—Stuart S. Levy
*Assistant Examiner*—Hoa T. Nguyen
*Attorney, Agent, or Firm*—Oliff & Berridge

[57] ABSTRACT

An optical data storage medium having a substrate, and an optical storage layer with a recording track or tracks for storing information to be read by a light beam. An interference layer is formed on the substrate, such that a tracking reflector defining the recording track or tracks is formed on the interference layer. A flattening layer is formed on the interference layer such that the flattening layer covers the tracking reflector and provides a flat surface on which the storage layer is formed. Each of the interference and flattening layers has a thickness substantially equal to 80 /8 or ($\lambda/8 + m\cdot\lambda/2$), where $\lambda$ represents a wavelength of the light beam as measured while the light beam is travelling through the interference and flattening layers, and m represents a natural number.

9 Claims, 2 Drawing Sheets

OPTICAL DATA STORAGE MEDIUM HAVING INTERFERENCE AND FLATTENING LAYERS EACH HAVING SPECIFIC THICKNESS FOR IMPROVED INFORMATION READING AND TRACKING RELIABILITY

BACKGROUND OF THE INVENTION

1. Field of the Invention

The present invention relates to an optical data storage medium such as optical disk on or from which information is optically written or read, by a laser beam, for example.

2. Discussion of the Prior Art

An example of a known magneto-optical data storage medium as an optical data storage medium is shown generally at 40 in FIG. 4. The data storage medium 40 includes a light-transparent substrate 42 which is formed of an acrylic or polycarbonate resin, glass or the like and has a tracking reflector 41, a protective layer 44 which is formed of SiO, AlN or similar material, a magneto-optical data storage layer 47 which is formed of GdTbFe, TbFeCo or similar material, another protective layer which is formed of AlN or similar material, and a reflecting layer 50 which is formed of Al or similar material. The protective layer 44, magneto-optical data storage layer 47, protective layer 48 and reflecting layer 50 are formed on the substrate 42 in the order of description. When information is written on this magneto-optical data storage medium 40, local spots on the magneto-optical storage layer 47 are irradiated with a laser beam and are thereby heated to a temperature near the Curie temperature. In this condition, each local spot is magnetized by exposure to an external magnetic field such that the direction of the magnetic field determines the direction of magnetization and thereby determines the logical value of the information to be written on the relevant local spot. The information written on each local spot on the magneto-optical data storage layer 47 is read based on the Kerr rotation angle of the polarization plane of a laser beam which is reflected from the portion of the medium 40 corresponding to the local spot. Namely, the amount of change in the Kerr rotation angle varies due to the Kerr effect, depending upon the direction of magnetization of the local spot. To increase the amount of change in the Kerr rotation angle due to the Kerr effect and thereby enhance the S/N ratio of a signal obtained from the reflected laser beam, the protective layer 44 and the reflecting layer 50 are provided to induce optical interference among these layers 44, 50 and the data storage layer 47. This increase in the Kerr rotation angle is referred to as "Kerr effect enhancement".

The tracking reflector 41 for tracking the recording track or tracks of the data storage layer 47 generally takes the form of a single spiral groove or a multiplicity of concentric grooves formed in the surface of the substrate 42 on the side of the data storage layer 47. In the presence of the tracking groove or grooves 41, the data storage layer 47, protective layers 44, 48 and reflecting layer 50 are locally recessed following the pattern of the groove structure.

To increase the Kerr effect enhancement by the optical interference among the protective, storage and reflecting layers 44, 47, 50, the thickness of the protective layer 44 is selected to be substantially equal to one quarter of the wavelength of the laser beam, and the thickness of the magneto-optical data storage layer 47 is selected so as to minimize the intensity of the laser beam which is directly reflected by the storage layer 47. This arrangement causes a relatively low intensity of the tracking laser beam which is reflected by the tracking groove or grooves 41, resulting in a low level of the tracking servo signal obtained from the tracking laser beam, and accordingly lowered reliability of the information reading laser beam due to misalignment of the beam with respect to the recording track. Further, the stepped or shoulder portions of the magneto-optical data storage layer 47 due to the tracking groove or grooves 41 tend to cause uneven or varying thickness at the edge portions of the recording track of the data storage layer 47, affecting the anisotropic properties (magnetizing direction) at the local spots on the recording track, and leading to instability of the anisotropic information to be read, i.e., low S/N ratio of the signal obtained from the information reading laser beam. Moreover, structural deterioration of the storage layer 47 and other layers may arise from the stepped portions 41, whereby the life expectancy of the data storage medium 40 is shortened.

SUMMARY OF THE INVENTION

It is therefore an object of the present invention to provide an optical data storage medium which includes an interference layer and a flattening layer both formed of light-transparent materials having higher values of refractive index than a substrate, for increased Kerr effect enhancement and improved S/N ratio of the information reading signal, and which medium assures minimum reduction in the intensity of the tracking beam reflected by the tracking reflector, for improved tracking accuracy and stability, improved information recording stability and enhanced structural durability.

The above object may be achieved according to the principle of the present invention, which provides an optical data storage medium having at least one recording track, comprising: (a) a light-transparent substrate; (b) an interference layer formed on one of opposite major surfaces of the substrate; (c) a tracking reflector formed on the interference layer, so as to define the at least one recording track; (d) a flattening layer formed on the interference layer, so as to cover the tracking reflector, the flattening layer having a flat surface remote from the interference layer; and (e) an optical data storage layer formed on the flat surface of the flattening layer for storing information. The information is read from the storage layer by an information reading light beam. The interference and flattening layers are formed of light-transparent materials having higher values of refractive index than the substrate, and each of these interference and flattening layers has a thickness substantially equal to $\lambda/8$ or $(\lambda/8 + m\cdot\lambda/2)$, where $\lambda$ represents a wavelength of the information reading light beam as measured while the light beam is travelling through the interference and flattening layers, and m represents a natural number.

In the optical data storage medium of the present invention constructed as described above, an optical interference takes place between the interference and flattening layers, since these layers are formed of light-transparent materials having higher refractive indices than the substrate, and since the thickness of each of these two layers is substantially equal to one eighth of the wavelength of the information reading light beam. That is, the total thickness of the interference and flattening layers formed between the substrate and the data storage layer is substantially equal to one quarter of the wavelength, thereby reducing the intensity of a light beam reflected by the data storage layer, but maximizes the Kerr effect enhancement for increased amount of change in the Kerr rotation angle of the information reading light beam due to the Kerr effect, thereby assuring improved S/N ratio of the information reading signal. Further, since the thickness of the interference between the substrate and the tracking reflector is substantially equal to one eighth of the wavelength of the light beam also used as the tracking light beam, the intensity of the tracking light beam reflected by the tracking reflector is relatively high, permitting a relatively high degree of tracking accuracy and stability of the tracking beam. In addition, the flat surface of the flattening layer assures constant thickness of the data storage layer, despite the provision of the tracking reflector. Accordingly, the information writing and reading stability and reliability are improved without the tracking reflector affecting the anisotropic properties of the recording track or tracks. Further, the data storage medium is free of structural deterioration which would otherwise occur due to the stepped portions produced by the tracking reflector and shorten the life expectancy of the medium.

The above advantages are provided where the thicknesses of the interference and flattening layers are substantially equal to $(\lambda/8 + m \cdot \lambda/2)$.

BRIEF DESCRIPTION OF THE DRAWINGS

The above and other objects, features and advantages of the present invention will become more apparent by reading the following detailed description of presently preferred embodiments of the present invention, when considered in connection with the accompanying drawings, in which.

DETAILED DESCRIPTION OF THE PREFERRED EMBODIMENTS

Figure 1:
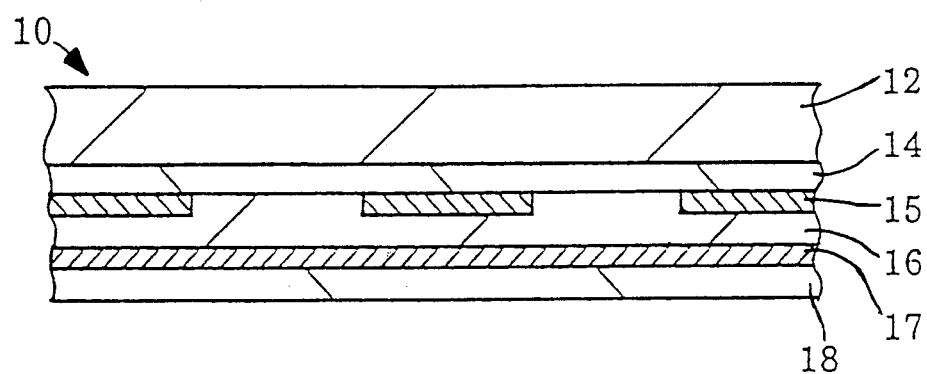
FIG. 1 is a fragmentary elevational view in cross section of one embodiment of an optical storage medium of the present invention.

Referring first to the fragmentary cross sectional view of FIG. 1, reference numeral 10 denotes an optical data storage medium in the form of an optical storage disk, which consists of a transparent disk substrate 12 formed of a glass material, and an interference layer 14, a flattening layer 16, a data storage layer 17 and a protective layer 18 which are formed in the order of description on one of the opposite major surfaces of the substrate 12. In the flattening layer 16, there is embedded a tracking reflector in the form of a continuous spiral reflector strip 15 such that the spiral reflector strip 15 is in contact with the surface of the interference layer 14 remote from the substrate 12.

The interference layer 14 consists of a light-transparent film of an oxide such as SiO, $TiO_2$ or $ZrO_2$, which is formed by a sputtering or vacuum vapor deposition process well known in the art. The thickness of the interference layer 14 is selected to be equal to about ⅛ of a wavelength $\lambda$ of a laser beam used for writing and reading information on or from the storage disk 10. The wavelength $\lambda$ is that of the laser beam travelling through the material of the layer 14.

The spiral reflector strip 15 as the tracking reflector, which is made of a suitable metal such as Al or Ta, is formed on the interference layer 14 by a photolithographic technique known in the art, so as to define a spiral recording track. More specifically, a metallic film such as a film of Al or Ta is initially formed over the entire surface area of the interference layer 14, by a vacuum vapor deposition, sputtering or other suitable method. Then, the metallic film is covered by a film of a photoresist formed by a spin coating method, for example. The photoresist film is subsequently exposed to a laser beam through a patterned mask corresponding to the spiral reflector strip 15 to be formed, so that a non-masked spiral portion of the photoresist film is removed to expose the corresponding spiral portion of the metallic film. The exposed spiral portion of the metallic film is etched by using an acid or alkaline solution, or by plasma etching. Finally, the remaining photoresist is removed by an organic solvent. Thus, the continuous spiral reflector strip 15 is formed as the tracking reflector on the interference layer 14.

The spiral reflector strip 15 may be replaced by concentric reflector rings formed to define concentric recording tracks.

The surface of the substrate 12 on which the spiral reflector strip 15 is formed is covered by the flattening layer 16 such that the reflector strip 15 is embedded within the thickness of the flattening layer 16. The flattening layer 16 is formed by spin coating, by applying a liquid metal alkoxide such as alkoxide of Ti or Zr to the interference layer 14 and reflector strip 15 while the substrate 12 is rotated, with the interference layer 14 facing up. The applied coating is baked at a suitable temperature, whereby a light-transparent metal oxide film such as $TiO_2$ or $ZrO_2$ is formed as the flattening layer 16. As a result, the spiral void defined by the spiral reflector strip 15 is filled by the material of the flattening layer 16, and the reflector strip 15 is covered by the flattening layer 16 which has a flat surface remote from the substrate 20.

The thickness of the flattening layer 16, i.e., the distance between the interference and magneto-optical storage layer 17 is selected to be equal to that of the interference layer 14, i.e., equal to about ⅛ of the wavelength $\lambda$ of the read/write laser beam travelling through the material of the layer 16.

The interference and flattening layers 14, 16 have a refractive index of 2.0 where these layers are formed of $ZrO_2$ (zirconia), or a refractive index of 2.7 where they are formed of $TiO_2$ (titania). In either case, the refractive index of the layers 14, 16 is higher than that of the glass material of the transparent disk substrate 12.

Figure 4:
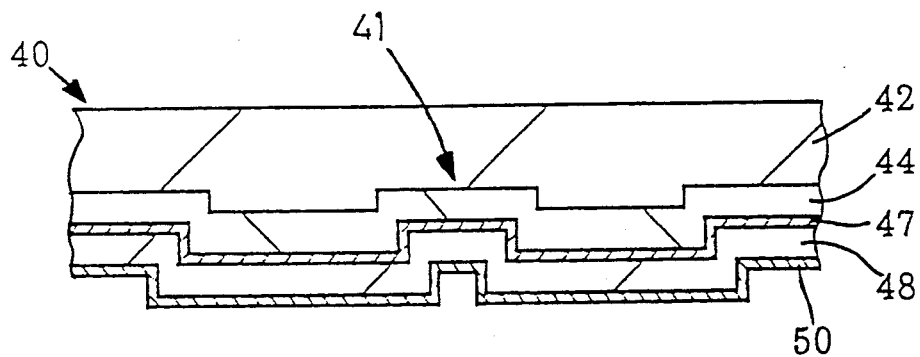
FIG. 4 is a fragmentary elevational view in cross section showing an example of a known magneto-optical storage medium.

On the flat surface of the flattening layer 16, there is formed the magneto-optical data storage layer 17 by sputtering or vacuum vapor deposition. The storage layer 17 is an amorphous thin film of an magneto-optical material consisting of an amorphous alloy (such as TbFeCo) which contains at least one rare earth element and at least one transition element. Since the data storage layer 17 is formed on the flat surface of the flattening layer 16, the layer 17 can be easily formed flat, having a substantially constant thickness over the entire surface area of the flattening layer 16, even though the spiral reflector strip 15 is locally formed on the surface of the disk substrate 12. Thus, the storage layer 17 does not have shoulder or stepped portions as in the conventional disk as shown in FIG. 4, and are therefore free from the conventionally experienced drawbacks such as structural deterioration originated from the stepped portions, an influence of the anisotropic properties at the local spots of the recording track, and consequent reduction in the S/N ratio upon reading of written information, and accordingly lowered information reading reliability as well as lowered information writing reliability.

The protective layer 18, which is provided to protect the data storage layer 17 from a chemical change, is formed of $SiO_2$ or AlN, for example, by vacuum vapor deposition or sputtering. However, the protective layer 18 may be made of the same material as the flattening layer 16.

When information is written on the magneto-optical disk 10, the magneto-optical data storage layer 17 is irradiated by a laser beam through the substrate 12, to heat each local spot on the recording track to a point near the Curie point. In this condition, the local spot is magnetized in the appropriate direction according to the information bit to be recorded, by applying an external magnetic field to the spot. Then, the local spot is cooled. Thus, the information is written on the storage layer 17.

When the written information is read from the storage layer 17, a laser beam is incident upon each local spot on the storage layer through the substrate 12. The Kerr rotation angle of the beam reflected by the local spot changes between two values, due to the well known magneto-optical effect, depending upon the direction of magnetization of that local spot, whereby the information may be read.

Since the thickness of the interference layer 14 is equal to $\lambda/8$, the intensity of the tracking beam reflected by the spiral reflector strip 15 is considerably larger than when the thickness is equal to $\lambda/4$. On the other hand, the intensity of the tracking beam reflected by the surface of the storage layer 17 is minimum, since the total thickness of the interference and flattening layers 14, 16 is equal to $\lambda/4$. Accordingly, the tracking servo signal obtained according to the push-pull or continuous far-field tracking method based on the tracking beam reflected by the reflector strip 15 and the storage layer 17 has a sufficiently high level.

It is also noted that the intensity of the information reading beam reflected from the surface of the storage layer 17 is relatively small, due to a multiple optical interference between the substrate 12 and the storage layer 17, since the total thickness of the interference layer 14 and the flattening layer is equal to about $\lambda/4$. However, the amount of change in the Kerr rotation angle of the beam transmitted through the storage layer 17 and reflected by the surface of the protective layer 18 contacting the layer 17 is sufficiently large, due to the Kerr effect enhancement. Accordingly, the level of the signal obtained from the amount of change in the Kerr rotation angle of the reflected information reading beam is sufficiently high, and the S/N ratio of the signal is improved. However, the intensity of the tracking beam reflected by the spiral reflector strip 15 is considerably large, since the strip 15 is provided on the interference layer 14 whose thickness is equal to $\lambda/8$. This is compared to the protective layer 44 of the known optical data storage disk of FIG. 4, which layer 44 has a thickness equal to $\lambda/4$ for obtaining a Kerr effect enhancement. Thus, the reflector strip 15 provided in the present magneto-optical data storage disk 10 does not suffer from a significant reduction in the level of the tracking servo signal due to the Kerr effect enhancement, which is encountered on the conventional magneto-optical storage disk having tracking grooves.

Figure 2:
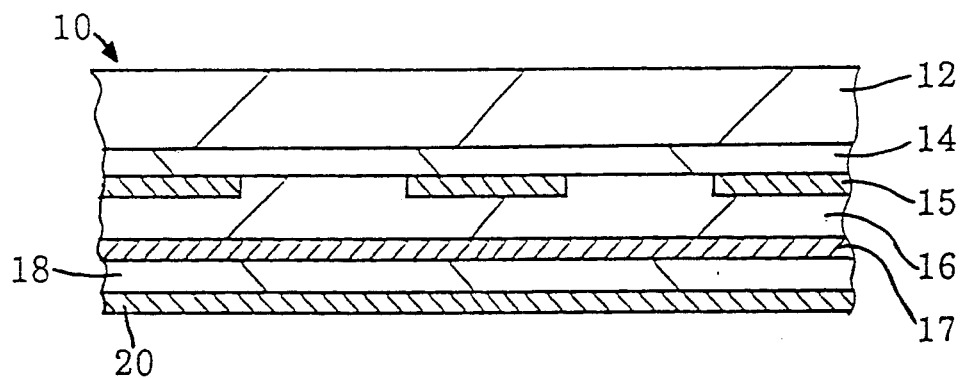
FIG. 2 is a fragmentary elevational view in cross section of another embodiment of the invention.

Referring next to FIG. 2, there will be described another embodiment of the optical data storage disk of the present invention. In this embodiment, the protective layer 18 is covered by a reflecting layer 20, so that the incident radiation which is transmitted through the magneto-optical storage layer 17 is reflected by the reflecting layer 20, and the reflected radiation is transmitted through the storage layer 17 in the reverse direction. As a result, the radiation is subjected to an increased Kerr effect enhancement, due to the Faraday effect as well as the Kerr effect. In this embodiment, too, the reduction in the intensity of the tracking beam reflected from the spiral reflector strip 15 is minimized, assuring high tracking stability.

Figure 3:
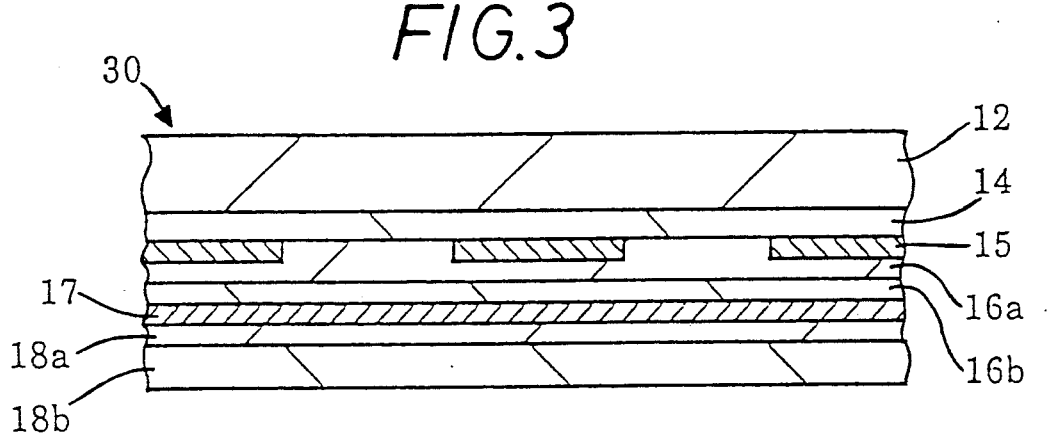
FIG. 3 is a fragmentary elevational view in cross section showing a further embodiment of the invention.

In the first and second embodiments of FIGS. 1 and 2, each of the flattening and protective layers 16, 18 consists of a single layer. However, the layers 16, 18 may consist of a plurality of layers, as illustrated in FIG. 3. In the example of FIG. 3, the flattening layer 16 consists of a first layer 16a formed on the substrate 12 by spin coating, and a second layer 16b formed on the first layer 16a = by sputtering or vacuum vapor deposition, while the protective layer 18 consists of a first layer 18a formed on the storage layer 17 by sputtering or vacuum vapor deposition, and a second layer 18b formed on the first layer 18a by spin coating. In this modified embodiment, the second fattening layer 16b, storage layer 17 and first protective layer 18a may be continuously formed in vacuum, whereby the optical disk 10 can be fabricated with high efficiency, while the storage layer 17 is protected from oxidation or other chemical changes. The protective layer 18b may be eliminated.

While the illustrated embodiments of FIGS. 1-3 use the magneto-optical data storage layer 17, the optical data storage medium of the present invention may use other types of storage layers such as a layer of Te or Bi on which information is recorded by forming pits therein, and a layer of TeOx on which information is recorded by changing the phase of the material. In these cases, the recording sensitivity of the storage layer may be improved by lowering the reflectance of the storage layer by using the interference and flattening layers whose refractive indices are higher than that of the substrate.

The interference layer 14, tracking reflector 15, flattening layer 16 and protective layer 18 may be modified in material and thickness, as needed. The interference and flattening layers need not be made of the same material, i.e., may be made of different materials. Where the thicknesses of the interference and flattening layers are both equal to $\lambda/8$, the advantages described above with respect to the first embodiment of FIG. 1 are provided. In this respect, it is noted that the wavelength $\lambda$ is that of the tracking and reading beam travelling through the material of the relevant layer. Where the wavelength in vacuum is $\lambda_0$ and the refractive index of the material is n, the wavelength $\lambda$ is equal to $\lambda_0/n$. Therefore, when the layers are made of different materials having different refractive indices n, the layers have different thicknesses $\lambda/8$ since the wavelengths $\lambda$ of the beam travelling through the materials are different. Similar advantages are obtained where the thickness is equal to $\lambda/8$ plus a multiple of $\lambda/2$, i.e., $(\lambda/8+m\cdot\lambda/2)$, where "m" is a natural number. However, the thicknesses of the interference and flattening layers need not be exactly equal to $\lambda/8$, and may be more or less different from the value of $\lambda/8$. In this case, the tracking signal level is accordingly lowered, but the tracking is possible. Further, the total thickness of the interference and flattening layers may be different from $\lambda/4$. In this instance, the Kerr effect enhancement by the interference and flattening layers is reduced, but the intensity of the beam reflected from the surface of the storage layer 17 is increased, permitting the use of a less sensitive photodetector for obtaining the tracking servo signal.

While the metallic thin film is used for the spiral reflector strip 17, the tracking reflector may be formed of a metallic compound or a material having a relatively low light reflectance.

The tracking operation on the present optical data storage medium may be effected by a three-beam method using a center beam and two side beams, rather than the push-pull method.

It is to be understood that the present invention may be embodied with various other changes, modifications and improvements, which may occur to those skilled in the art, without departing from the spirit and scope of the invention defined in the following claims.

What is claimed is:

1. A data storage medium having at least one recording track, comprising:

a light-transparent substrate;

an interference layer formed on one of opposite major surfaces of said substrate;

a tracking reflector formed on a portion of said interference layer, so as to define said at least one recording track;

a flattening layer formed on said interference layer and said tracking reflector, so as to cover said interference layer and said tracking reflector, said flattening layer having a flat surface remote from said interference layer; and a data storage layer which is formed on said flat surface of said flattening layer for storing information, and from which said information is read by an information reading light beam, said interference and flattening layers being formed of light-transparent materials having higher values of refractive index than said substrate, each of said interference and flattening layers having a thickness substantially equal to $(\lambda/8+m\cdot\lambda/2)$, where $\lambda$ represents a wavelength of said information reading light beam as measured while said light beam is travelling through said interference and flattening layers, and m represents a natural number including zero.

2. A data storage medium according to claim 1, wherein said interference layer is formed of a metal oxide selected from the group including $SiO_2$, $TiO_2$ and $ZrO_2$.

3. A data storage medium according to claim 1, wherein said tracking reflector is formed of a metal selected from the group including aluminum and tantalum.

4. A data storage medium according to claim 1, wherein said flattening layer is formed of a metal oxide selected from the group including $TiO_2$ and $ZrO_2$.

5. A data storage medium according to claim 1, wherein said light-transparent substrate has a refractive index of 1.46, while said interference and flattening layers have a refractive index of 2.0 or 2.7.

6. A data storage medium according to claim 1, wherein said data storage layer consists of a magneto-optical data storage layer formed of a magneto-optical material.

7. A data storage medium according to claim 1, further comprising a protective layer formed on said data storage layer for protecting the data storage layer.

8. A data storage medium according to claim 7, further comprising a reflecting layer formed on a surface of said protective layer remote from said data storage layer.

9. A data storage medium according to claim 7, wherein said flattening layer consists of a first flattening layer formed by spin coating on said interference layer, and a second flattening layer formed by sputtering on said first flattening layer, and said protective layer consists of a first protective layer formed by sputtering on said data storage layer, and a second protective layer formed by spin coating on said first protective layer.

* * * * *